United States Patent [19]

Boyer

[11] 3,801,830

[45] Apr. 2, 1974

[54] SIGNAL AMPLIFICATION CIRCUIT WITH PHASE DETECTING MEANS AND VARIABLE SIGNAL LEVEL RECOGNITION MEANS

[75] Inventor: Wesley D. Boyer, Dearborn Heights, Mich.

[73] Assignee: Ford Motor Company, Dearborn, Mich.

[22] Filed: Feb. 5, 1973

[21] Appl. No.: 329,922

[52] U.S. Cl. ............... 307/235 R, 307/290, 324/16, 328/146

[51] Int. Cl. ............................................ H03k 5/20

[58] Field of Search ............ 307/23 S, 290; 324/16; 328/146

[56] References Cited

UNITED STATES PATENTS

| | | | |
|---|---|---|---|
| 3,416,004 | 12/1968 | Taylor | 307/290 X |
| 3,612,912 | 10/1971 | Schwartz | 307/290 |

*Primary Examiner*—John Zazworsky

*Attorney, Agent, or Firm*—Keith L. Zerschling; Robert A. Benziger

[57] ABSTRACT

A circuit is described for generating an output signal pulse of substantial uniform magnitude in response to an input signal which may be variable over a range of signal magnitude such that large signal noise may exceed the magnitude of the small signals. The circuit provides automatic threshold adjustment in response to the magnitude of the immediately preceding input signal to discriminate against noise signals on the input lead. The circuit also provides for automatically switching out of the threshold controlling means when the input signal threshold value has been exceeded so that the turning off of the output signal may be accomplished substantially in response to the "zero voltage crossing" of the input signal to provide an electrical event which may have a predetermined time relationship to a sensed mechanical event for subsequent utilization purposes.

10 Claims, 9 Drawing Figures

SIGNAL AMPLIFICATION CIRCUIT WITH PHASE DETECTING MEANS AND VARIABLE SIGNAL LEVEL RECOGNITION MEANS

BACKGROUND OF THE INVENTION

1. Field of the Invention

The present invention relates to the field of electrical or electronic circuits for generating or otherwise producing an output signal of constant characteristic in response to an input signal having a wide range of variable characteristics. More particularly, the present invention is related to that portion of the above noted field in which the signal from a magnetic transducer is to be amplified or otherwise suitably shaped to provide an output signal pulse suitable for use by other electronic circuitry or components. In particular, the present invention is related to that portion of the above noted field which is concerned with the providing of a rectangular output pulse of fixed magnitude and/or duration having a predetermined phasing with respect to an input signal which may be for example one cycle of a sinusoidally shaped waveform whose peak amplitude and period are variable over a wide range of values.

2. Description of the Prior Art

One class of prior art devices in the same general field as the instant invention has been concerned with input pulses of a substantially constant character. That is to say that the magnitude of the input pulse may vary by a ratio of no more than about four to one. By adjusting the circuit to recognize the occurrence of an input signal value approaching the maximum signal value for a minimum magnitude pulse, all input signal pulses are thereafter readily recognized and the occurrence of noise at the input having a magnitude less than about, for example, 20 to 25 percent of the magnitude of the largest magnitude pulse received on the input line will be ignored. Such devices however are not suitable where the magnitude of the noise at high magnitude input signals exceeds the magnitude of the small magnitude input signals. It is, therefore, an object of the present invention to provide a circuit which may receive input pulses having magnitude variations greater than five to one to produce a uniformly shaped output pulse in response to each and every input pulse while ignoring noise input signals. It is also an object of the present invention to provide a circuit for receiving input pulses wherein the noise signals which may be associated with the maximum amplitude input signal are greater in magnitude than the minimum magnitude input signal and for rejecting these noise signals. Noise in this context is intended to mean any spurious signal, whether electrically or magnetically induced on the input signal conductor.

Co-pending commonly assigned patent application Ser. No. 312,996 which is a continuation in part of patent application Ser. No. 124,080, now abandoned, illustrates a system in which a magnetic transducer is arranged to sense magnetic discontinuities in a rotating member and to produce an output pulse indicative of the passage of the magnetic discontinuity in proximity to the sensor. This class of devices is arranged to respond to the attainment of the threshold signal as described hereinabove and to produce an output signal having a fixed pulse duration. As a result of the fact that the attainment of the threshold value can vary by as much as 5° of angular rotation when the circuitry of the above noted copending application is applied to a situation where the angular rotation may vary over a range of speeds of about 30 to one, the application of such devices to internal combustion engines for the entire range of engine speeds inherently induces significant angular errors. Since it is possible to accurately align the center of the magnetic discontinuity with the center of the magnetic sensor it therefore becomes a further object of the present invention to provide circuitry for recognizing this particular angular relationship and for producing an electrical signal indicative of the attainment of this relationship. More particularly, it is an object of the present invention to provide electrical circuitry for receiving as input signal the output of a magnetic sensor positioned to respond to magnetic discontinuities in a movable member, for example, movable by rotation, wherein the speed of motion may change over a spectrum of about 30 to one and wherein a constant characteristic output signal is desired and furthermore wherein the output signal includes an electrical event which occurs in predetermined phase relationship with respect to a predetermined positioning of the magnetic discontinuity with respect to the magnetic transducer. More specifically, it is an object of the present invention to provide circuitry having the afore-noted objectives and which may be made insensitive to noise and other spurious signals which may have a value, under maximum input signal conditions, in excess of the value of the minimum input signal.

SUMMARY OF THE PRESENT INVENTION

The present invention provides electrical circuitry having a plurality of current sources and suitably matched electronic components so that a comparator may determine with a high degree of accuracy the occurrence of an input signal. A reference value is established for the determination of the occurrence of an initial input signal and the reference value is thereafter periodically modulated or otherwise modified by a controlled current source so that the reference value will increase or decrease in a prescribed fashion with respect to the input signals. In order to provide an electrical signal having an electrical event which is in predetermined phase relationship to the attainment of a predetermined relationship of the magnetic discontinuity with respect to the magnetic transducer, the circuitry of the present invention is also provided with a means for periodically modifying the reference value to be substantially equal to the input value at the attainment of the predetermined angular relationship. More specifically, the circuitry of the present invention is provided with means for periodically reducing the reference value to a value which is substantially equal to the value of the steady state input signal which corresponds to a zero voltage crossing point. By "zero voltage crossing" is meant the condition wherein the input signal value is substantially equal to the value during steady state nonsignal conditions. Zero in this context refers to the voltage at a lack of signal condition rather than a lack of voltage.

A controlled current source is arranged to respond to the input signals to generate as its output a current having a magnitude directly related to the peak magnitude of preceding input signal. This value may then be applied to a suitable sized resistive element to controllably vary the reference bias applied to, for example, a differential amplifier. In order to controllably change the amount of bias applied to the differential amplifier, the circuit is also provided with switching means responsive to the occurrence of an output signal to provide for shunting of the current produced by the controlled current source and furthermore to provide for a predetermined reduction in the amount of bias voltage applied to the differential amplifier.

DETAILED DESCRIPTION OF THE DRAWINGS

Figure 1:
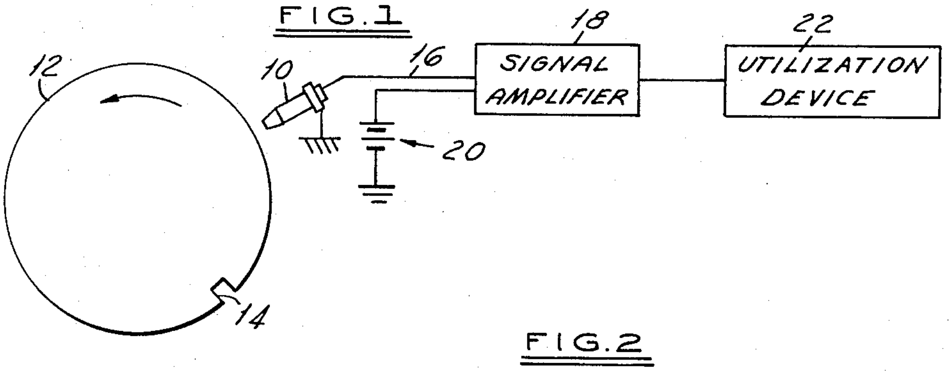
FIG. 1 is a schematic illustration of a position sensor with which the circuitry of the present invention is of utility.

Referring now to FIG. 1, a representative use of the circuit of the present invention is illustrated. A magnetic transducer 10 is positioned to observe the rotation of a rotary member 12 so that passage of notch 14 in proximity to sensor 10 may produce an output signal over conductor 16 for receipt by the signal amplifier 18 of the present invention. Notch 14 represents a magnetic discontinuity which may be sensed by magnetic transducer 10. For example, if transducer 1o is a permanent magnet transducer receiving a reference current over conductor 16 it will generate a magnetic field as well as a steady state DC voltage on conductor 16. Passage of discontinuity 14 will disturb the magnetic field produced by transducer 10 and hence the voltage appearing on conductor 16. This voltage variation will be sensed by amplifier 18 and will be communicated to a utilization device 22. The passage of magnetic discontinuity 14 in front of magnetic sensor 10 is representative of the attainment of a selected angular relationship between rotary member 12 and the sensor 10 and this information may be used by utilization device 22 to initiate or terminate a control sequence. While rotary member 12 is shown as having one magnetic discontinuity 14 and this magnetic discontinuity is in the form of a notch or void, member 12 may readily be provided with more than one magnetic discontinuity and the magnetic discontinuities may be provided in the form of projecting teeth rather than notches. It will be appreciated that if member 12 is rotated at a relatively high speed, it is highly desirable that this member be well balanced. The provision of complementary magnetic discontinuities is therefore contemplated. However, rotation of member 12 at high speed under normal bearing situations will readily result in the gap between transducer 10 and member 12 varying slightly during rotation of member 12 which may be caused by bearing wear, by a lack of perfect roundness of member 12 or by vibration. These slight variations in spacing between member 12 and transducer 10 at high values of rotational speed could readily result in a fluctuation of the voltage (noise) appearing on conductor 16 which would be as great in magnitude as the fluctuation in voltage appearing on that conductor representative of the passage of the magnetic discontinuity 14 in front of transducer 10 at a lower value of rotational speed of member 12. It can thus be seen that signal amplifier 18, in order to reject the spurious, or noise, signals must be provided with a means of determining whether or not a particular signal appearing on conductor 16 is an input signal indicative of the passage of magnetic discontinuity 14 in front of transducer 10 or a noise signal merely indicating a fluctuation in the gap between member 12 and transducer 10. Signal amplifier 18 must, in other words, validate the received signal as an input signal before the desired signal processing can occur.

Figure 2:
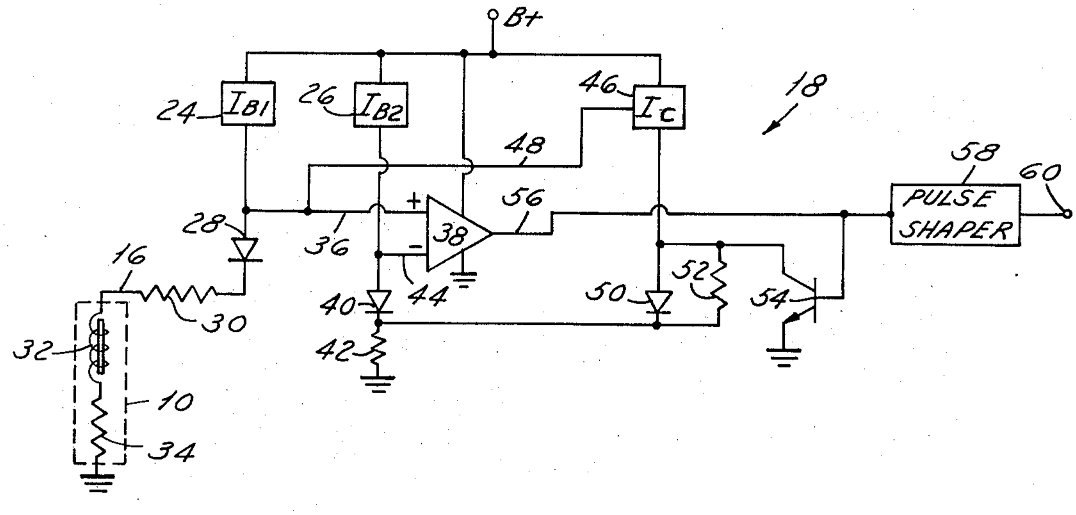
FIG. 2 is an electronic block diagram schematic of the circuitry of the present invention.

Referring now to FIG. 2, the signal amplifier 18 of the present invention is illustrated in a schematic block diagram. The circuit of FIG. 2 is energized by a source of voltage identified as B+ which may be, for example, the 12 volt (nominal) battery voltage of an automotive battery. The magnetic transducer 10 in this embodiment receives a current flow from the signal amplifier 18. Signal amplifier 18 is comprised of a pair of constant current sources 24 and 26 which are arranged to provide currents $I_{B1}$ and $I_{B2}$ respectively. Current source 24 is arranged to provide a current flow through diode 28 and resistance 30 to the magnetic transducer 10. As illustrated, the magnetic transducer 10 is comprised of an inductance 32 having an internal resistance 34 shown separately for convenience. One side of diode 28 is communicated by conductor 36 to one input of differential amplifier 38. Amplifier 38 is also provided with energization from the B+ source. Current source 26 provides a current flow through diode 40 and resistance 42 to ground. One side of diode 40 is also communicated to input terminal 44 of differential amplifier 38.

A third current source 46 generating a current identified as $I_c$ communicates with the conductor 36 over conductor 48 and is arranged to generate an output current, which has a predetermined relationship with respect to the voltage appearing on conductor 36 and this relationship will be discussed in detail hereinbelow. Current $I_c$ is arranged to flow through diode 50 and resistor 42 to ground. Resistor 52 is connected in parallel with diode 50. Transistor 54 has its collector connected to one terminal of diode 48, its emitter connected to ground, and its base communicating with the output terminal 56 of the differential amplifier 38. Transistor 54 operates as a switch to shunt the current $I_c$ to ground while transistor 54 is conducting and to concomitantly place resistance 52 in parallel with resistor 42 through the conducting transistor to ground.

In the circuit illustrated in FIG. 2, the anode of diode 28 is communicated to the positive input of differential amplifier 38 while the anode of diode 40 is communicated to the negative input of differential amplifier 38. With this arrangement, the voltage appearing at the anode of diode 40 represents the reference value and the voltage at the anode of diode 28 represents the input signal. Whenever the input signal has a greater magnitude than the reference value, the output of differential amplifier 38 will be relatively high and whenever the potential of the input signal is less than the reference value the output of differential amplifier 38 will be at the low, or ground potential, value. The resistive value of resistor 42 and the current value $I_{B2}$ of constant current source 26 are arranged to provide, with respect to the current $I_{B1}$ produced by constant current source 24 and the resistive values of resistors 30 and internal resistance 34, a slightly more positive voltage at the anode of diode 40 than appears at the anode of diode 28 for the steady state value of current $I_{B1}$. Thus, the output of differential amplifier will normally be at the low value. For example, by arranging currents $I_{B1}$ and $I_{B2}$ to be substantially equal, and the value of resistor 42 to be slightly greater than the cumulative value of resistances 30 and 34, differential amplifier 38 will be in the off or nonsignal condition.

Figures 4A, 4B, 5A, 5B, 6A, 6B:
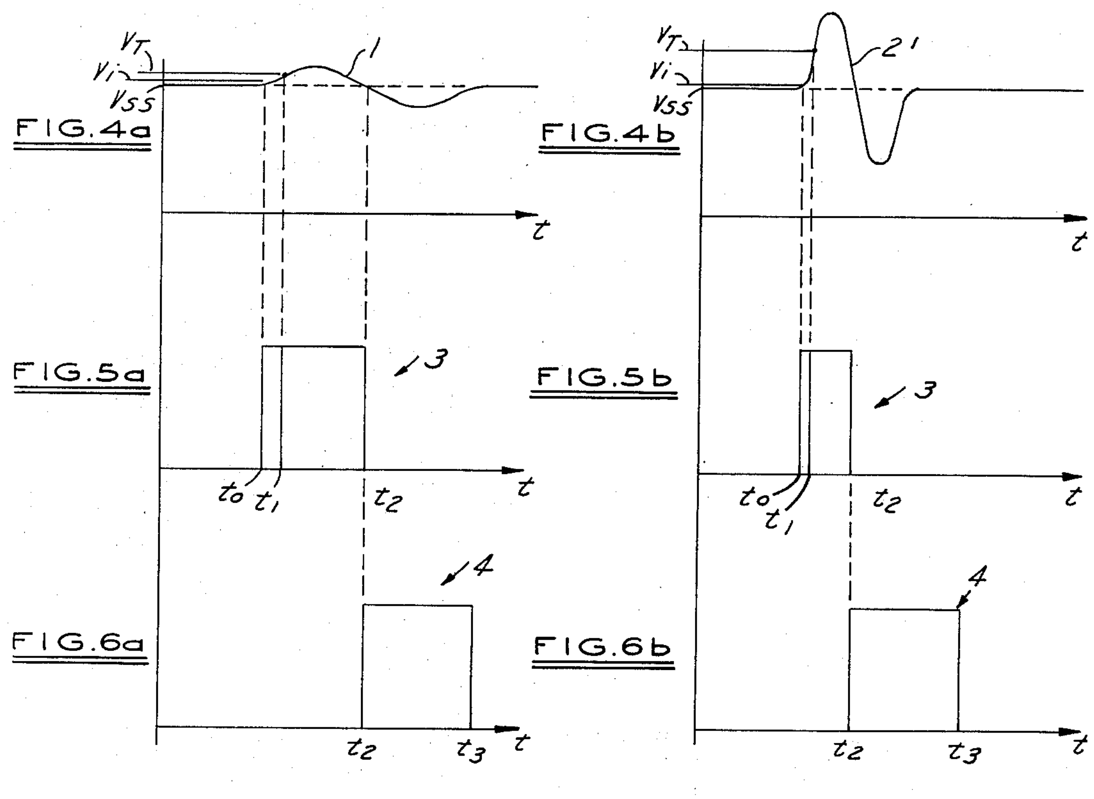
FIGS. 4*a*, 4*b*, 5*a*, 5*b*, 6*a* and 6*b* are graphs illustrating the voltage signals present in the various portions of the FIG. 2 schematic and the FIG. 3 diagram as a function of time for different magnitude input signals.

With reference to FIGS. 4*a* and 4*b*, the voltage appearing at input terminal 36 of the differential amplifier 38 under nonsignal, or steady state, conditions will be at some DC value, $V_{ss}$. For a magnetic discontinuity corresponding to notch 14 in rotary member 12 (of FIG. 1) and for a magnetic sensor 10 receiving a current flow through the signal lead 16, the signal indicative of passage of discontinuity 14 in proximity to sensor 10 will initially cause the voltage appearing on conductor 16 and hence at the input 36 of differential amplifier 38 to increase in value to some peak magnitude, to decrease in value to a "negative peak" approximately as much below the steady state value, $V_{ss}$ as the first peak was above the steady state value, and to thereafter return to the steady state value. This signal will be approximately a sinusoidal signal with a magnitude and a period proportional to speed and constitutes an AC component added to the steady state DC value. FIG. 4*a* illustrates a signal 1 for a relatively low speed of passage while FIG. 4*b* illustrates a signal 2 for a higher speed of passage. As can be readily seen by inspection, the magnitude of signal 2 is approximately four times the magnitude of signal 1 indicative of approximately a 4:1 speed differential. The time scales of these graphs differ to aid in the illustration and are not representative of the speed differential.

Initially, when the immediately preceding input pulse was sufficiently remote in time that the controlled current $I_c$ is zero, the voltage value appearing at input terminal 44 of the differential amplifier 38 will be slightly more positive than the voltage appearing at input terminal 36. With reference to FIGS. 4*a* and 4*b*, the voltage at input terminal 36 is represented by $V_{ss}$ while $V_t$ represents the initial threshold level established by $I_{B2}$ and resistance 42. The initiation of a signal (1 or 2) will cause the voltage appearing at input terminal 36 to rise and differential amplifier 38 will respond to generate at terminal 56 an output pulse 3 (of FIGS. 5*a* and 5*b*) when the voltage at input terminal 36 rises above the threshold established at input terminal 44 which will initially be at $V_t$. With reference to FIGS. 5*a* and 5*b*, the initiation of this output signal would correspond in time to the pulse which is initiated at time $t_o$ in these two figures. The occurrence of the output signal at output terminal 56 will cause the switching transistor 54 to be turned on providing a shunt path from the cathode of diode 40 through resistance 52 and the saturated conducting transistor 54 to ground. This will have the effect of reducing the current flowing through resistance 42 and hence reducing the reference signal appearing at input terminal 44 of the differential amplifier 38. By suitably selecting the magnitude of the shunt path resistance 52, the value to which the reference signal appearing at input terminal 44 is reduced may be readily controlled. Preferably, the reference value is reduced to a value which approximately equals the DC voltage value $V_{ss}$ produced at the input terminal 36 under nonsignal conditions, the zero voltage crossing value. Therefore, as the signal (1 or 2) arrives at a value which equals the value $V_{ss}$, the output occurring at the output terminal 56 will terminate and go to the low value. The resulting pulse will therefore have a duration extending from time $t_o$ to time $t_2$ in FIGS. 5*a* and 5*b*.

Controlled current source 46 will respond preferably to the peak value which appeared on the input terminal 36 and will thereafter generate a current representative of this peak value. This current will flow through diode 50 and resistance 42 to thereafter elevate the reference signal appearing at input terminal 44 of the differential amplifier 38. By suitably selecting the relationship between the peak value appearing at input terminal 36 and the current $I_c$ generated in response thereto, the amount by which the reference value appearing at input terminal 44 is elevated may be controlled. Preferably, the values are selected to provide for the increase in the voltage appearing at input terminal 44 to an amount which approximately equals one half of the peak value obtained by the preceding input signal. This value is designated $V_T$ in FIGS. 4*a* and 4*b*. In order to generate an output signal at output terminal 56, the input terminal 36 must therefore have a signal impressed thereupon having a magnitude which reaches or exceeds the value $V_T$ established by the combined current flow of currents $I_{B2}$ and $I_c$ through resistance 42. The next succeeding signal reaching or exceeding this level will cause an output signal to be generated at output terminal 56 at a time which corresponds to the time $t_1$ in FIGS. 5*a* and 5*b*. Following initiation of the output signal, the circuit of FIG. 2 will respond as described hereinabove terminating the output signal at the time $t_2$ as illustrated in FIGS. 5*a* and 5*b*. The threshold value $V_T$ may be held constant from one input signal to the next or, as described hereinbelow with reference to FIG. 3, it may be permitted to vary or decay in a prescribed fashion from one input signal to the next. In either case, reestablishment of the threshold value $V_T$ for each input signal is desired for greatest accuracy of noise rejection.

Referring again to FIG. 2, the output terminal 56 of the differential amplifier 38 is also communicated to pulse shaper 58 which is provided with an output terminal 60. Pulse shaper 58 may be arranged to respond to the low-going transition of the pulses 3 generated by the differential amplifier 38 as the output signal thereof to provide at output terminal 60 a pulse 4 having a magnitude and a duration which is independent of the pulses 3 produced by differential amplifier 38 and which have a starting point in time corresponding to the termination of the pulses 3. The pulse 4 will therefore extend in time from the time $t_2$ to the time $t_3$ which duration will be independent of the pulses 3 and hence will be independent of the signal produced by the magnetic sensor 10.

Figure 3:
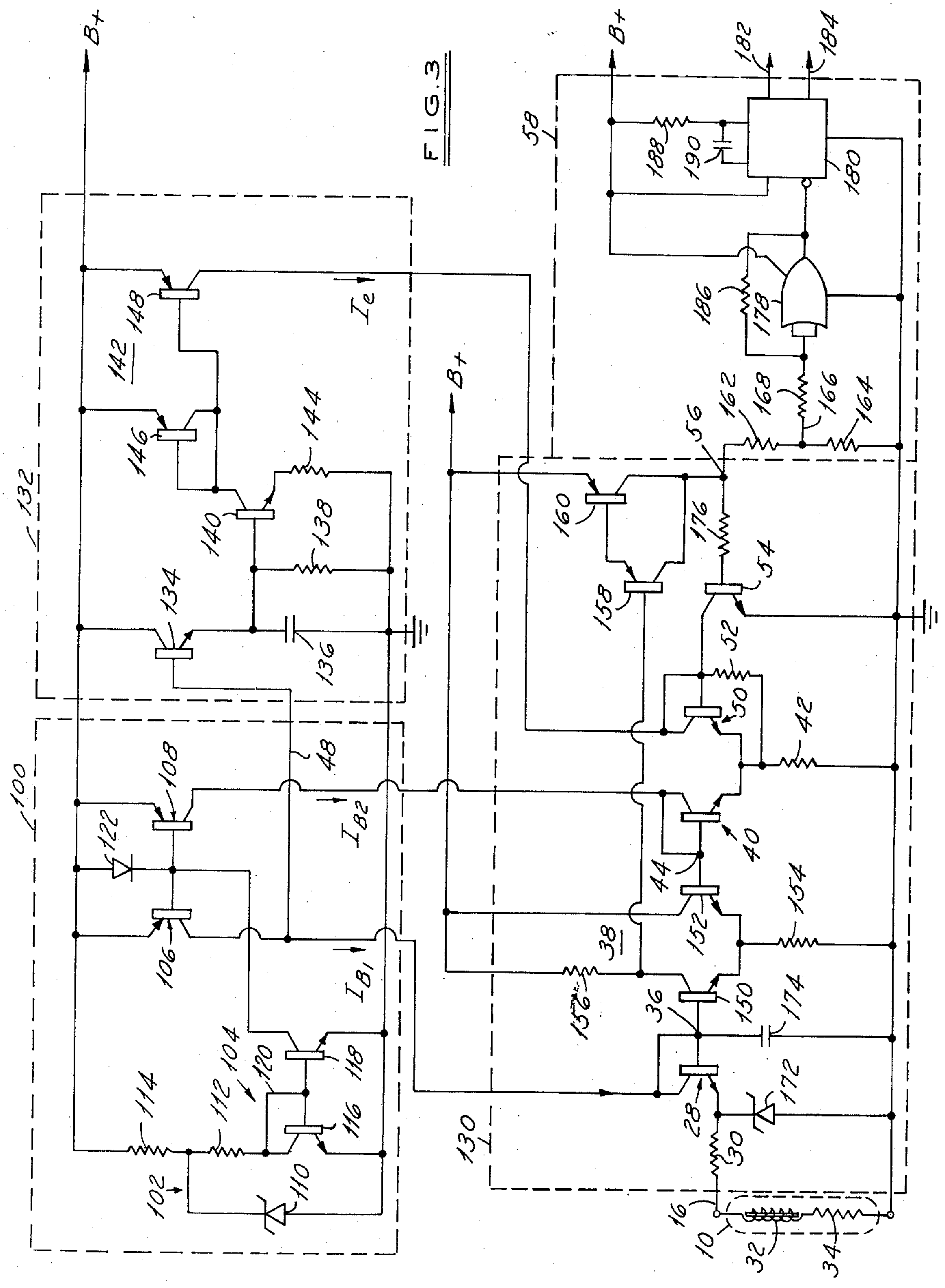
FIG. 3 is an electronic circuit diagram of one implementation of the block diagram schematic of FIG. 2.

Referring now to FIG. 3, a specific circuit embodiment of the schematic diagram of FIG. 2 is illustrated. For convenience, identical electrical circuit components have the same number in FIGS. 2 and 3. The circuit of FIG. 3 is comprised of a current source means 100 operative to generate a pair of currents identified as $I_{B1}$ and $I_{B2}$. Current source 100 is comprised of a constant voltage source 102, a current mirror means 104 and a pair of base coupled, emitter coupled transistors 106 and 108. Transistors 106 and 108 are matched and are interconnected to comprise a second current mirror means. Constant voltage source 102 is comprised of zener diode 110, resistance 112 and resistance 114. This configuration is operative to provide a fixed constant current flow through resistance 112. Current mirror means 104 is comprised of a pair of base coupled, emitter coupled matched transistors 116, 118 with the collector of transistor 116 connected to the common base by conductor 120. This arrangement is operative to provide a constant current flow into transistor 118 through the collector thereof substantially equal to the current flow through resistance 112. The collector of transistor 118 is connected to the common base junction of the transistors 106, 108. Transistors 106 and 108 are preferably matched to provide virtually identical operating characteristics and particularly substantially equal collector currents. The common base of the transistors 106, 108 is connected to the B+ source of supply by diode 122. The current extracted from the common base junction by the collector connection of transistor 118 is operative to cause substantially equal currents to flow through the emitter-base junction of each of transistors 106, 108 and is therefore operative to provide collector currents in these transistors which are virtually identical. By this is meant that minor differences between the otherwise matched transistors 106, 108 will permit the currents $I_{B1}$ and $I_{B2}$ (the collector currents) to differ slightly but the degree of difference will be negligible.

The currents generated by current source means 100, currents $I_{B1}$ and $I_{B2}$ are communicated to diode connected transistors 28, 40 within amplifier section 130. Current $I_{B1}$ is arranged to flow through the diode connected transistor 28, resistance 30, and magnetic transducer 10 to ground. Because of the fixed voltage drop across a pn, or emitter-base, junction and the steady state voltage difference across the resistance 30 and the sensor internal resistance 34, input terminal (here junction) 36 which is located at the base of the diode connected transistor 28 will reside at a predeterminable DC potential. Variations in the magnetic field associated with inductance 32 will cause a signal voltage to be imposed on the DC signal. With reference to FIGS. 4*a* and 4*b*, the character of this signal voltage is illustrated. It can be seen that for a rectangular magnetic discontinuity such as illustrated in FIG. 1, the signal voltage may be approximated by one cycle of a sinusoidal voltage signal added to the DC value, $V_{ss}$.

The voltage appearing at junction 36 is also communicated by conductor 48, shown here for convenience located within current source means 100, to the peak detector means 132. Peak detector means 132 is comprised of an emitter-follower connected transistor 134 whose base is connected to conductor 48, an RC network comprised of capacitor 136 and resistance 138, isolation transistor 140 and a further current mirror means 142. Transistor 134 is connected in an emitter follower configuration so that the voltage appearing at the emitter of transistor 135 and which is communicated to the RC network and principally to capacitor 136, will be the voltage appearing on conductor 48 reduced by one pn junction. Under steady state conditions, the capacitor 136 will charge up to the $V_{ss}$ value reduced by one pn junction value. In the presence of the input signal as applied to input terminal 36 by the inductance 32 of magnetic transducer 10, the transistor 134 will become forward biased and the voltage appearing at the emitter thereof and accumulated across capacitor 136 will follow the voltage at junction 36. However, as soon as the signal voltage has peaked and begun to decline, the transistor 134 will become reverse biased and capacitor 136 will have a voltage impressed thereacross which is representative of the voltage signal generated by magnetic transducer 10. This voltage will turn on (forward bias) transistor 140. This voltage will also begin to dissipate as a flow of current through resistance 138. The collector of transistor 140 is communicated to the common base junction of transistors 146, 148 which comprise the further current mirror means 142 and this connection is operative to extract current from the common base. The collector of transistor 146 is also communicated to the collector of transistor 140. The amount of current thus flowing into the collector of transistor 140 will be just slightly in excess (by twice the base current) of the current flowing in the collector of transistor 148. The collector of transistor 148 is connected to amplifier section 130 and in particular to the diode-connected transistor 50 located in the amplifier means 130. The magnitude of the current $I_c$ can be seen to be directly a function of the magnitude of the voltage applied to the base of transistor 140 and can be controlled by the magnitude of the emitter or load resistor 144 communicating the emitter of transistor 140 to ground.

The amplifier means 130 further includes a comparator in the form of differential amplifier means 38 comprised of an emitter coupled pair of transistors 150, 152. The base of transistor 150 is coupled to junction 36 while the base of transistor 152 is coupled to the base lead of diode connected transistor 40. Under steady state conditions, the current flow of currents $I_{B1}$ and $I_{B2}$ will be operative to cause the base of diode connected transistor 28 (input terminal or junction 36) to reside at a first potential and the base of diode connected transistor 40 (input terminal or junction 44) to reside at a second potential with the various potentials being dependent upon the magnitudes of the currents $I_{B1}$ and $I_{B2}$ and the resistive values of the resistances 30 and 34 and resistance 42. Under steady state conditions, and in order to accomplish the objectives of the present invention, the resistive values are selected so that the base of diode connected transistor 40 resides at a slightly higher potential than the base of diode connected transistor 28. This will be operative to cause transistor 152 to be conducting since its base resides at the higher potential and to turn off transistor 150 since conduction of transistor 152 causes the common emitter connection to reside at a potential which is higher than that necessary for transistor 150 to be forward biased. This potential will be substantially equal to the voltage on capacitor 136 minus the voltage across the emitter base pn junction of transistor 140 divided by the resistive value of resistance 144. Current flow through emitter of the transistors 150 and 152 will be communicated to the ground or common connection by resistance 154. Whenever input terminal 36 is at a higher potential then input terminal 44, the state of conduction of the transistors 150, 152 will reverse and current will flow into transistor 150 through the collector thereof so that a voltage drop will occur across resistance 156. This voltage drop is communicated to the Darlington-connected pair of transistors 158, 160 and is operative to cause that connection to be conductive. Conduction of the Darlington pair of transistors 158, 160, which operate as a power switch, will be operative to cause the potential appearing at the junction comprising the output terminal 56 to rise and a current to flow through resistances 162, 164. This will cause a voltage potential to be applied over conductor 166 to resistance 168.

As soon as the potential at input terminal 36 rises, the increasing voltage is communicated through conductor 48 to the peak detector means 132 where it is operative to cause a current, $I_c$, to be generated in the collector of transistor 148. This current is normally communicated to the diode connected transistor 50 having its base-emitter junction connected in parallel with resistance 52. However, the presence of the high potential at circuit location 56 will be operative to cause transistor 54 to go into conduction and transistor 54 is connected with its collector connected to the base of diode connected transistor 50 and its emitter connected to ground. Thus, conduction of transistor 54 will be operative to place the base of diode connected transistor 50 at a potential very close to the ground potential and to shunt the current $I_c$ to ground. This will also place resistance 52 in series with the collector-emitter junction of transistor 54 and this series combination in parallel with resistance 42. Current $I_{B2}$ will thus be dissipated to ground through a parallel connection which will lower the potential at the emitter of the diode connected transistor 40 thereby lowering the value of the reference signal applied to input terminal 44 of the differential amplifier 38. The transistor 150 will be held in conduction until the potential appearing at the input terminal 36 has dropped to a value which is lower than that then existing at input terminal 44.

Amplifier means 130 also includes a zener diode 172 to provide over voltage protection for the emitter of diode connected transistor 28, a filter capacitor 174 to filter the signal applied at input terminal 36, and a current limiting resistance 176 in the base circuit of transistor 54.

The pulse shaper means 58 is comprised of a pair of integrated circuit components including Schmitt trigger 178 and monostable multivibrator 180. Monostable multivibrator 180 is provided with a pair of output leads 182 and 184 which provide complementary signals. Schmitt trigger 178 and monostable multivibrator 180 are both energized by a source of voltage which is denoted B+ and which may be for example a 5 volt source. Resistance 186 provides feedback for Schmitt trigger 178 while resistance 188 and capacitor 190 provide the RC timing network for monostable multivibrator 180. Schmitt trigger 178 may be, for example, Texas Instruments, Inc. integrated circuit chip SP 384 while the monostable multivibrator 180 may be Texas Instruments, Inc. integrated circuit chip 74 123. As here illustrated, the signal from Schmitt trigger 178 is communicated to the inverting input of monostable multivibrator 180 so that the monostable multivibrator 180 will respond only to the low going transition of the Schmitt trigger 178. Schmitt trigger 178 is operative to increase the slope of the high going and low going transitions of the output of the comparator means 38 and in combination with the monostable multivibrator 180 provide an output pulse (4 of FIGS. *6a* and *6b*) which is initiated at time $t_2$, and has a constant duration to time $t_3$ and is compatible with high speed electronics such as transistor transistor logic (TTL).

As illustrated, transistors 116, 118 and diode connected transistors 28, 40 and 50 may be, for example, contained in one integrated circuit chip such as that available from RCA and designated CA3046. Transistors 134, 140, 150, 152 and 54 may be located in an identical single integrated circuit chip. Transistors 106, 108, 146, 148, 158 and 160 may be located in a single integrated circuit chip such as for example RCA integrated circuit chip CA3084. Representative values for the capacitors may be as follows:

| | |
|---|---|
| Capacitor **136** | 0.1 microfarad |
| Capacitor **174** | 0.001 microfarad |
| Capacitor **190** | 20 pf |

Representative values for the resistances may be as follows:

| | |
|---|---|
| Resistance **30** | 10K ohms |
| Resistance **42** | 12K ohms |
| Resistance **52** | 75K ohms |
| Resistance **112** | 100K ohms |
| Resistance **114** | 10K ohms |
| Resistance **138** | 1 Megohm |
| Resistance **144** | 22K ohms |
| Resistance **154** | 10K ohms |
| Resistance **156** | 62K ohms |
| Resistance **162** | 6.8K ohms |
| Resistance **164** | 3.3K ohms |
| Resistance **168** | 1K ohms |
| Resistance **176** | 100K ohms |
| Resistance **186** | 10K ohms |
| Resistance **188** | 4.7K ohms |

Typical inductive and resistance values for a magnetic transducer with which the present invention is of utility would be for example an inductance 32 of 250 mh and an internal resistance 34 of 440 ohms.

With reference now to FIGS. 3, *4a*, *4b*, *5a*, *5b*, *6a*, and *6b*, the operation of the present invention will be described. FIGS. *4a* and *4b* illustrate two possible conditions of voltage appearing at the input terminal 36 of differential amplifier 38. It can be seen by inspection that the magnitude of the signal portion of the voltage atributable to operation of the magnetic transducer can vary greatly. Under the initial conditions, the voltage applied to input terminal 44 is just slightly greater than the voltage applied to the input terminal 36 as may be seen by a comparision of the resistive values $I_{B1}$ and $I_{B2}$ being substantially equal. Thus, transistor 150 can be arranged to have an initial turn-on valve corresponding to the voltage at input terminal 36 reaching the valve illustrated for time $t_o$ for resistance 42 and resistances 30 and 34 (12K ohms 10.44K ohms); on the curves of FIGS. *4a* and *4b*. This will cause the voltage signal appearing at output terminal 56 to be as illustrated in FIGS. *5a* and *5b* having a duration from time $t_o$ to time $t_2$. Subsequent to the initial action of the circuit, a current $I_c$ will be provided from the peak detector 132 to flow through the diode connected transistor 50 and resistor 42 operative to raise the initial values of voltage appearing on the input terminal 44. By selecting a resistor 144 having a value which is approximately twice the value of resistance 42, the additional voltage drop produced across resistance 42 on account of the current flow $I_c$ can be made to be approximately equal to one-half of the voltage impressed across capacitor 136. Since this represents the preceding signal magnitude peak, the threshold value for differential amplifier 38 can be made to be approximately equal to one-half of the preceding signal magnitude peak and furthermore by providing an RC time constant which is large, in this instance, one-tenth of a second, the threshold value will decay from the maximum value toward a value determine solely by current $I_{B2}$ at a rate which is compatible with signal spacing and magnitude changes associated with normal decelerations of the rotary member 12

(FIG. 1) when driven by an internal combustion engine. In the presence of an output signal and the consequent shorting of the base of diode connected transistor 50 to ground and the placing of resistor 52 in series with the collector emitter junction of transistor 54 both in parallel with resistor 42, the turn off threshold may be adjusted to the desired value by suitably selecting the resistive value of resistor 52. In the application of the instant invention to a system according to FIG. 1 in which accurate angular positioning of the magnetic flux discontinuity 14 with respect to the transducer 10 is desired, it can readily be shown that the zero voltage crossing of the sinusoidal signal voltage, signal 1, according to FIGS. 4*a* and 4*b* is substantially coincident with the angular alignment of the center of the magnetic discontinuity 14 with the center of transducer 10. Thus, by selecting a resistive value for resistance 52 which in conjunction with the collector to emitter voltage drop of transistor 54 will reduce the potential appearing at input terminal 44 to a value which is substantially equal to the steady state or DC value occurring at input terminal 36, switching of the differential amplifier 38 can be assured at the generated zero voltage crossing point. For this reason, the resistive value of resistance 52 is made to be approximately six times the resistive value of resistance 42.

Pulse shaper 58 is arranged to respond to the switching of transistor 54 from the conductive to the nonconductive state and the consequent grounding of the conductor 166 by generating an output pulse as illustrated by pulse 4 in FIGs. 6*a* and 6*b* on one of its output conductors 182 and 184 and by generating the complement of this pulse on the other of its output conductors 182 and 184. The duration of the output pulse is determined by the time constant associated with monostable multivibrator 180 and may be, for example, 100 nanoseconds.

With particular reference to FIG. 3, the instantaneous value of the threshold voltage, $V_T$ may be expressed as $$V_T=\left[I_{B2}+\frac{V_{SP}-0.7+I_{B1}(R_1+R_2)}{R_3}\frac{-1}{NSR_4C_1}\right]R_5-I_{B1}(R_1+R_2)$$

Where $V_{SP}$ is the peak voltage of the immediately preceding input signal, $R_1$ is the resistance value of resistance 30, $R_2$ is the resistance value of resistance 34, $R_3$ is the resistance value of resistance 144, $R_4$ is the resistance value of resistance 138, $R_5$ is the resistance value of resistance 42, $C_1$ is the capacitance of capacitor 136, $N$ is the number of input signal cycles per revolution of member 12 and $S$ is the speed of member 12 in revolutions per second.

It can thus be seen that the present invention readily accomplishes its stated objectives. The circuit continually modifies the threshold value in response to the immediately preceding pulse to discriminate against noise while maintaining the integrity of the phase relationship between input and output signals. Thus, the circuit can be used to generate a pulse suitable for use with high speed electronics from a relatively unsuited electromechanically generated input and can define a preselected positional relationship, such as an angular relationship with a high degree of accuracy.

I claim:

1. A circuit for generating an electrical signal having a predetermined phase relationship with respect to an input signal comprising:

comparator means having first and second input terminal means and an output terminal means;

input signal means communicating with said first input terminal means for applying a voltage signal thereto representative of the input signal;

reference signal means communicating with said second input terminal means for generating a reference voltage signal;

source means communicating with said reference signal means operative to establish a steady state level of reference voltage signal which differs from the voltage applied to said first input terminal means by said input signal means under nonsignal conditions by a preselected amount;

detecting means communicating with said input signal means and coupled to said reference signal means operative to controllably vary the reference voltage signal in response to the immediately preceding input signal;

said comparator means operative to generate an output having first and second signal levels, said first signal level being indicative of the occurrence of an input signal and switchable between said first and second signal levels in response to the voltage signal at said first terminal means changing its electrical relationship with respect to the voltage signal at said second terminal means; and switching means communicating with said output terminal means and responsive to the first signal level operative to controllably switch the reference voltage signal to a preselected value.

2. The circuit of claim 1 wherein said switching means are operative to controllably switch the reference voltage level to a value substantially equal to the level of the input signal means voltage signal under nonsignal conditions whereby the output of the comparator means may switch from the first signal level to the second signal level in response to the zero crossing of the input signal.

3. The circuit of claim 1 wherein said detecting means include means responsive to the peak magnitude of the immediately preceding input signal for controllably increasing the reference voltage signal.

4. The circuit of claim 3 wherein the detecting means further include decay means for reducing the reference voltage signal from the increased value to its steady state level in a predetermined manner.

5. The circuit of claim 3 wherein the reference signal means comprise impedance means and the detecting means comprise a controlled current source means operative to generate a current having an initial magnitude responsive to the peak magnitude of the immediately preceding input signal and means for communicating this current to the reference signal impedance means.

6. The circuit of claim 5 wherein said switching means are further operative to shunt said controlled current source current away from said reference signal impedance means when the comparator means output is at the first level whereby the controlled current source current will not affect switching of the comparator output from the first level to the second level but may contribute to subsequent switching of the comparator output from the second level to the first level.

7. The circuit of claim 6 including further pulse generator means responsive to said comparator means output switching from said first level to said second level operative to generate in response thereto a pulse having a predetermined pulse duration.

8. A circuit for generating an electrical signal having a predetermined phase relationship with respect to an input signal comprising:

first and second current source means;

input signal impedance means receiving said first current and generating a voltage signal having a steady state nonsignal value and an A.C. signal component having a first occurring peak value and a succeeding inverted peak value;

reference signal impedance means receiving said second current and generating a voltage signal having a first reference level;

said first and second currents, said input signal impedance means and said reference signal impedance means cooperative to provide a reference voltage signal value which is approximately equal to the steady state nonsignal value but intermediate said nonsignal value and a first occurring peak value;

comparator means having an output terminal and a pair of input terminals, each of which receives one of said reference voltage signal and said input voltage signal operative to generate a first level of output signal when said input signal exceeds said reference signal and a econd level of output signal when said reference signal exceeds the input signal;

switching means responsive to one of said first and second levels of output signal operative to controllably alter said reference voltage signal to change said reference voltage signal to a value substantially equal to the steady state non-signal value whereby switching from one of said first and second levels of output signal to the other can be accomplished in response to a zero crossing of the A.C. component of the input signal; and controlled current source means communicating with said input impedance means operative to generate a current having a magnitude related to the first occurring peak value of the immediately preceding input signal A.C. component and conductor means for applying this controlled current to said reference impedance means whereby the reference voltage value may be controllably varied in the direction of the immediately preceding first occurring peak value.

9. A circuit for generating an electrical signal having a predetermined phase relationship with respect to an input signal comprising first and second current source means;

input signal impedance means receiving said first current and generating a voltage signal having a steady state nonsignal value and an A.C. signal component having a first occurring peak value and a succeeding inverted peak value;

reference signal impedance means receiving said second current and generating a voltage signal having a first reference level;

said first and second currents, said input signal impedance means and said reference signal impedance means cooperative to provide a reference voltage signal value which is approximately equal to the steady state nonsignal value but intermediate said nonsignal value and a first occurring peak value;

comparator means having an output terminal and a pair of input terminals, each of which receives one of said reference voltage signal and said input voltage signal operative to generate a first level of output signal when said input signal exceeds said reference signal and a second level of output signal when said reference signal exceeds the input signal; and switching means responsive to one of said first and second levels of output signal operative to controllably alter said reference voltage signal to change said reference voltage signal to a value substantially equal to the steady state nonsignal value whereby switching from one of said first and second levels of output signal to the other can be accomplished in response to a zero crossing of the A.C. component of the input signal;

said switching means including shunt impedance means which are electrically coupled in electrical parallel relation with said reference impedance means when the output of the comparator means is at a first level and are electrically removed from parallel relation with said reference impedance means when said comparator output is at a second level.

10. The circuit of claim 9 wherein said switching means comprise a solid state electronic switch means responsive to said output signal operative to establish a current flow path therethrough upon the occurrence of one of said first and second levels of output signal and operative to terminate the current flow path upon the occurrence of the other of said first and second levels of output signal and shunt impedance means interconnecting said reference signal impedance means and said electronic switch means, said shunt impedance means and said electronic switch means being electrically connected in parallel with said reference signal impedance means.

* * * * *